Nov. 30, 1965  A. T. GARDNER  3,220,546
VIBRATING TREATMENT FOR FIBER RECOVERY FROM WASTE EFFLUENTS
Filed May 28, 1962
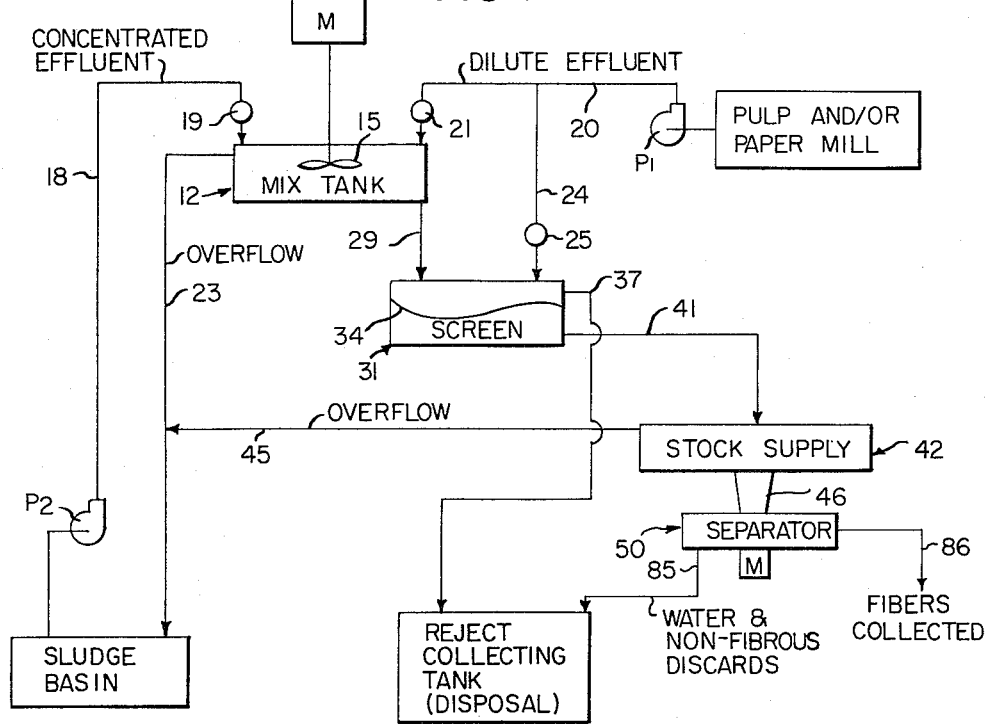
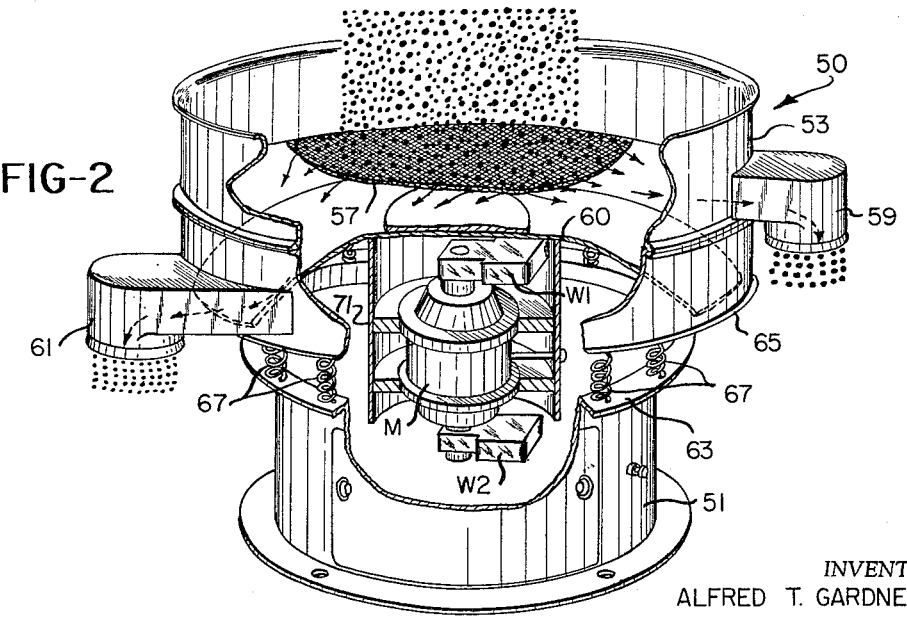
INVENTOR.
ALFRED T. GARDNER
BY John W. Teare
ATTORNEY

United States Patent Office 3,220,546
Patented Nov. 30, 1965

3,220,546
VIBRATING TREATMENT FOR FIBER RECOVERY
FROM WASTE EFFLUENTS
Alfred T. Gardner, Pasadena, Tex., assignor to Champion
Papers Inc., Hamilton, Ohio, a corporation of Ohio
Filed May 28, 1962, Ser. No. 198,083
4 Claims. (Cl. 209—7)

This invention relates to the recovery of the fiber content of waste effluents obtained in the manufacture of pulp, paper and the like. More particularly, it relates to the recovery of the cellulosic fiber content from such effluents in which the predominant proportion of suspended material is non-fibrous.

The paper industry in recent years has become increasingly plagued with a problem of waste disposal of the huge quantities of aqueous effluents which normally arise from the pulping, bleaching, papermaking and coating operations. The substantial quantities of suspended materials contained in these effluents necessitate the removal thereof, commonly by settling techniques, lest their discharge along with tremendous quantities of water as raw waste into rivers and streams present a hazard to fish and other wildlife. Too, such effluent discharge materials usually represent pure waste in a real sense in that it has been common practice to accumulate, bury or otherwise dispose of the concentrated solid material, often called "effluent sludge," which has been removed by settling. Since this sludge contains valuable pulp fibers, such disposal techniques represent a costly and inefficient solution to the removal problem even aside from the avoidance of stream pollution.

Heretofore, separation methods employed in an attempt to effectively and economically recover the fibrous portion of predominately non-fibrous waste effluents obtained in the manufacture of pulp and paper have been unsuccessful in producing in suitable yield a cellulosic product of low ash content, this property being ordinarily necessary either for reuse on the paper machine or for other purposes. Particularly the problem of excessive ash content arises since the suspended material in the effluent is predominately composed of non-fibrous particles, at least on a weight basis, which are difficult to completely remove from the fibers. Thus as a solution to the problem it has been the common practice to lagoon or bury the settled solids.

In accordance with this invention a method is provided for the recovery of the fiber content from waste effluents obtained from the manufacture of pulp, paper and the like wherein the suspended material in the effluent is predominately non-fibrous particulate material.

According to the process the effluent in the form of an aqueous suspension containing no more than about 1% by weight of fibers, is subjected to the action of a separating medium which normally would be capable of passing therethrough the individual fibers of the suspension as well as the non-fibrous particles The physical movement of the medium is, however, conducted in such a gyratory pattern as to cause entanglement of the fibers one with the other to form fibrous agglomerates which are of a size sufficient to be separated and retained by the medium while the water and non-fibrous material readily passes therethrough. Simultaneous with this separation, the agglomerates are caused to discharge from the medium without passage therethrough until finally, after being drained of much of the water carrier and essentially freed of non-fibrous particles, they are collected for reuse either on the paper machine or in other applications.

Unexpectedly it has been found that the utilization of the foregoing process is peculiarly and uniquely effective in recovering the fiber content from aqueous effluents wherein the quantity of non-fibrous material exceeds that of the fibrous material on a weight basis. In addition to providing an essentially ash-free fibrous product in efficient yields, the process is characterized by such simplicity of operation as to permit the recovery thereof on a continuous, economically practical basis as is necessary for commercial utilization. Thus further economies in the paper making and pulping process are effected and in addition the volume of reusable material recovered reduces the disposal problem by a proportional amount. The value of the invention is readily understood when it is pointed out that prior attempts to separate the fibers from such effluents by usual screening and centrifuging techniques have been unsatisfactory for commercialization from the standpoint either of the cost involved or the poor quality, high ash products which was obtained.

Surprisingly it has been found that with the use of a separating medium, essentially a screen with openings or apertures of a size sufficiently large as to normally fail to retain neither fibers nor non-fibrous particles, which is moved in a vibrating gyratory pattern, i.e. simultaneously in several directions about a multitude of axes, the fibers will be separated principally in the form of fiber agglomerates which are recovered and are reusable in the papermaking process. In other words, although the dimensions of the screen apertures approximate or exceed those of the fibers as well as the non-fibrous particles, the fibers are essentially retained by virtue of the particular motion imparted to the screen whereas the non-fibrous material is freely passed therethrough by the aqueous vehicle or carrier.

The invention will be further described with reference to the accompanying drawing wherein:

FIG. 1 is a schematic diagram illustrating the process of this invention, and

FIG. 2 is an enlarged cross section, in part merely schematic, of the separating medium which can be used in carrying out the invention.

As shown in FIG. 1, there is supplied into mixtank 12, a dilute effluent such as ordinary waste wash water obtained from the sewage system of a pulp and/or paper mill. This is conveniently introduced through line 20 under pressure, by means of pump P–1, with the flow rate being regulated by valve 21. The composition of the effluent can vary quite widely depending upon the exact nature of the various pulp and/or papermaking operations. Normally the effluent will contain a fraction of a percent to several percent of suspended material on a weight basis, whereas the fiber content alone will comprise a relatively small proportion, often from 0.01 to 1% of the effluent. In addition to the fibers, the suspended material will be composed of non-fibrous, relatively small size particles including mineral fillers such as clay, calcium carbonate, and silicates, coprecipitates of alum with various additives, latex particles and the like.

In addition to the dilute effluent or wash water supplied to the mixtank 12, a concentrated effluent or sludge obtained from a conventional sludge or settling basin may also be introduced therein, e.g. by means of pump P–2, through line 18 and valve 19. By varying the relative proportions of wash water and sludge, the proportion of suspended material in the aqueous suspension to be treated can be accurately regulated and controlled for the most efficient and effective fiber recovery.

A further advantage accrued from the utilization of a sludge basin is that for small scale operations the fiber recovery process need only be operated intermittently; that is, after a substantial amount of sludge has been accumulated. For this purpose the dilute effluent employed to the lower the solids content of the sludge may be simply clarified waste water obtained from the settling basin.

The construction of the mixtank 12 is not critical. As shown it comprises a vessel provided with draw-off line 29 and a propeller type agitator 15, driven by motor M. If desired it may be provided with an overflow line 23 for returning excess suspension to the sludge basin.

In practice it will be found that the aqueous suspension discharged from the mixtank will contain significant quantities of extraneous coarse size material such as bark char, wood chips, knots, dirt specks and other rejects from the pulp and/or paper making operations. In order to prevent contamination therewith of the fibers to be subsequently recovered, it will in most cases be desirable to remove such coarse size material by an intermediate stage. For this purpose a simple screening device 31 provided with a coarse screen 34, having for example 6 to 10 wires per inch or about 3 mm. openings, is entirely satisfactory.

The rejects retained upon the screen are conveniently discarded, as for example through line 37 to a reject collecting tank for disposal, whereas the aqueous suspension is discharged through line 41.

In some cases it will be desirable to direct a shower of dilute effluent against screen 31 by means of line 24, provided with valve 25, in order to wash the rejects off of the screen.

The aqueous suspension, from which the coarse material has been eliminated, is in a form ready for recovery of the fiber content thereof. As previously mentioned the fiber content should constitute less than about 1% by weight, preferably 0.1 to 1% of fibers, before being subjected to the action of the separating medium. The concentration of non-fibrous solid material will ordinarily be several times the amount of fibrous material, usually 1 to 10% or more by weight. The nature of any dissolved material in the aqueous vehicle will be of little concern to the recovery process.

In order to ensure the maintenance of an adequate supply of the aqueous suspension for recovery of the fiber content, this being particularly desirable for purposes of a continually operating process, a stock supply vessel 42 should be provided. Desirably this is complete with an overflow line 45 for the return of any excess suspension to the sludge basin or other disposal means.

From the stock supply vessel, the aqueous suspension containing fibrous and non-fibrous particles is led through a suitable entry line 46 to a separatory medium which in the drawing is illustrated as a separating device 50. As hereinbefore described, the separating medium is such as would normally be capable of passing therethrough the fibers as well as the non-fibrous material. However due to the unusual movement thereof in a gyratory pattern, the fibers are caused to be retained and collected after reduction of the water content and may subsequently be recovered. The bulk of the non-fibrous material and water passes through the separating medium. The construction and operating details of the separating medium are more particularly set forth hereinafter with reference to FIG. 2. The separating action may be effected as a single phase in the process or, preferably, as a multiple phase operation as by the use of a plurality of separating devices connected in parallel.

The water and non-fibrous particles which have been separated from the fibers are led via line 85 to a reject collecting tank for subsequent disposal by settlement or other means. From the standpoint of an economical advantage, it will be appreciated that although some disposal means will ordinarily be provided for the non-fibrous fraction, the volume which must be handled will greatly be reduced. Thus by separating the fibrous material, which owing to its relatively low density may comprise as much as 80% or more by volume of the suspended effluent solids, only a much smaller volume of waste solids will have to be discarded.

The fibrous discharge product is recovered by means of line 86, and, depending upon the use for which it is to be employed, may be further treated as desired. Since ordinarily there is no difficulty in obtaining such a product which, on a dry basis, contains in excess of 80% or 85% or more by weight of fibers, it can readily be utilized as a low grade papermaking furnish which if desired, can be partially bleached to improve its brightness. One substantial application for the fibers is in the manufacture of cellulose felt materials, as for example roofing felts. For this or other end uses the fibers can be dried, fluffed and baled or otherwise packed for shipment.

Turning now to FIG. 2 it may be seen that the separating medium 50 is comprised essentially of a base 51 and separating chamber 53. The chamber 53 is provided with a screen 57 which may be removably mounted therein. The chamber is also provided with two outlets 59, 61, one of which is disposed at approximately the same level as the screen 57, the other of which is disposed adjacent the dome-shaped bottom 60 of the chamber 53. Thus material retained, in this case fiber, on screen 57 will be collected and discharged as will be seen, through the outlet 59, while the non-retained material, in this case mineral filler, latex particles, etc., and water will pass through the screen and be discharged through outlet 61. It will be noted that chamber 53 is mounted on base 51 such as to permit the chamber to move and vibrate relative to the base which is normally rigidly affixed to the floor or ground. The mounting of the chamber 53 on the base 51 is effected by providing each with a complementary annular flange 63, 65. Disposed between these flanges are a series of coil springs 67. These springs are arranged in a regular geometric pattern around the periphery of the base 51 and bear on the flange 63 with the flange 65 of chamber 53 in turn resting on their upper end. The springs 67 are of such strength as not to be completely compressed by the weight of chamber 53 and its associated parts but nevertheless of sufficient strength to "floatingly" position the upper chamber upon the base. Thus the chamber 53 is floatingly mounted on the base 51 so as to be capable of moving thereon in practically any axis or plane, vertically, laterally, etc.

In order to produce the unique motion which permits the separating medium to retain fibers which ordinarily would pass freely through the screen 57, the bottom of chamber 53 is provided with an additional housing 71. To this housing, which is more or less merely a mounting bracket, is bolted an electric or similar prime motor M so as to rotate about a vertical axis. This motor is provided with the usual shaft extending outwardly at either end and to each end of the shaft above and below the motor M is affixed by any suitable means a pair of eccentric weights W1 and W2. These weights may be identical or may be of different value as may be desired and additionally may be aligned vertically or out of phase so as to produce the desired motion of chamber 53. Obviously as the motor M is energized the weights W1 and W2 are rotated rapidly setting up a series of centrifugal and tangential vibratory forces. Because of the fact that the motor M is rigidly mounted on chamber 53 which in turn is "floatingly" mounted on base 51 it is apparent that the combined forces will cause chamber 53 to move in a gyratory motion in both the horizontal and vertical axes. This unique motion will cause fibers to catch on the screen wires, entangle one with the other and eventually ball up into agglomerates incapable of passage through the screen. Also due to the unique motion imparted to chamber 53 the fiber agglomerates are dispelled outwardly toward the periphery thereof and eventually will discharge from outlet 59 while the remaining solids and water discharge through outlet 61. Thus chamber 53 does not rotate but it will "wobble" and vibrate such that material will be caused to move to this periphery of chamber 53 in a spiral path for collection and discharge from aperture 59.

In the selection of suitable screening means for the separating medium, consideration must be given to the relation of the fiber lengths to the sizes of the sieve openings. The sieve openings or apertures should approximate or exceed the fiber lengths; that is they may be somewhat shorter or longer than the length of the fibers which are to be separated. The majority of pulp fibers employed in the manufacture of paper will have lengths of 1.0 to 6.0 mm., those in the higher portion of the range, particularly 3.0 to 6.0, being obtained from soft or coniferous woods while those in the lower portion of the range, particularly 1.0 to 1.7, being obtained from hard or broadleaf woods. On the average the softwood fibers will be about 3.5 mm. in length and the hardwood fibers about 1.0 mm. in length, with in each case the length being about 100 times the width. Obviously the non-fibrous particles will on the average have diameters less than 10 microns.

Given an average length for fibers contained in the aqueous suspension to be treated, sieve openings of 30% to 200% the length of that value will permit the recovery of at least 55% and often 75% or more of the fibers. On a weight basis the fibrous product obtained will contain, dry, 80 to 85% or more of fibers. Thus for an effluent in which the fibers are predominately Southern pine with an average length of 3.0 mm., the sieve openings, standard A.C.S. screen scale, should be about 1 to 6 mm. Although the length of the fibers can exceed the longest dimension of the sieve openings, the majority thereof would normally be capable of passing through the openings because of their high length to width ratio. In practice it has been found particularly desirable to choose a screen having sieve openings which are 50% to 100% the average length of the fibers to obtain a high yield, usually over 75%, of the fibers contained in the aqueous suspension. In many cases it will be practical and desirable to follow a separating action with such a screen by a second and similar screen, usually provided in the same device, of even finer sieve openings to retain the last traces of fibers, i.e. to increase the yield of fibers to 90 to 95% or more. Thus a finer screen, say of 0.4 to 0.8 mm. sieve openings will satisfactorily remove such residual traces of fiber without becoming clogged since the large bulk of fibers has already been removed.

The invention will be further described with reference to the following example wherein parts are by weight unless otherwise stated.

*Example*

Employing the procedure outlined in FIG. 1, an aqueous suspension was prepared from the admixing of dilute effluent and sludge as obtained from the sewage and settling systems respectively of a combined pulp and paper mill.

The dilute effluent was clarified water obtained from a settling basin and containing only negligible quantities of suspended solids. The suspended solids content of the sludge was about 17%, this being composed on a dry basis of 22% fibers and 78% non-fibrous particles. The fibers in the sludge were predominately Southern pine having an average fiber length of 3.0 mm. and the non-fibrous material was mainly clay and calcium carbonate fillers having a particle size of a few microns or less.

The dilute effluent and sludge were supplied to the mixer in a ratio so as to provide upon blending an aqueous suspension, containing in the range of 0.6 to 0.8% fibers. The suspension was filtered by means of a perforated metal screening device, having 3 mm. openings, to remove the small amount of coarse size particles therein. Thereafter, at a rate of 550 gallons per minute, the suspension was supplied to a separating medium as depicted in FIG. 2 of the drawing. The medium, comprising four individual screening devices in parallel each having screens about 48 inches in diameter and supplied from the single stock supply vessel, permitted a double screening by means of two superimposed screens of 10 and 30 mesh respectively on top and bottom. The sieve openings of the first screen were about 2.0 mm. and those of the second screen were about 0.59 mm. About 70% of the fibers in the suspension were retained upon the 10 mesh screen with 25% being retained upon the 30 mesh screen.

The fractions of fibers discharged from the separating medium were combined and found to contain less than about 15% of non-fibrous material on a dry basis. The fibers were recovered, pressed, and fluffed to a moisture content of 30%. The waste discharge product, composed largely of non-fibrous particles, contained only about 1.3% of fibers, dry basis. The volume of the solid material which would require further disposal, e.g. by burying, had been reduced by about 80% because of the removal of the relatively low density fibers.

Having described the invention what is claimed is:

1. Method for the recovery of the fiber content from waste effluent obtained from the manufacture of pulp, paper and the like wherein the suspended material in said effluent is predominately non-fibrous particulate material which method comprises: subjecting said effluent in the form of an aqueous suspension containing no more than about 1% by weight of fibers, and having up to 10% by weight of said non-fibrous material, to the action of a separating medium normally capable of passing therethrough individual fibers from said suspension, moving said medium about a vertical axis in a gyratory and tilting pattern to cause entanglement of the fibers one with the other to form fibrous agglomerates of a size so as to be separable by said medium from the particulate material, and simultaneously therewith reducing the water content of said fibers by causing said agglomerates to traverse said medium without passage therethrough while maintaining said agglomerates subject to said separating medium for a period sufficient to drain a portion of the aqueous vehicle and the predominate non-fibrous part of the particulate material from said agglomerates.

2. The method of claim 1 wherein the said aqueous suspension contains about 0.1 to 1% by weight of fibers.

3. Method for the recovery of the cellulosic fiber content from a free-flowing aqueous suspension containing as suspended material a minor weight proportion, not exceeding 1% by weight of the suspension, of discrete cellulosic fibers and a major weight proportion, up to 10% by weight of the suspension, of non-fibrous particulate material such as mineral filler and the like, the relative particle size of said fibers substantially exceeding the relative particle size of said non-fibrous material, which method comprises: subjecting said suspension to the action of a separatory zone to selectively retain the fibers thereon and pass the aqueous vehicle and non-fibrous material therethrough while moving said zone with a multi-axial simultaneous gyratory and tilting motion relative to a vertical axis to cause anentanglement of the fibers one with another without which said zone would be incapable of retaining the fibers thereon and to cause the said retained and entangled fibers to horizontally traverse said zone while reducing the water content thereof, and thereafter collecting said fibers.

4. The method of claim 3 wherein the collection of said fibers is effected at the periphery of said zone.

References Cited by the Examiner

UNITED STATES PATENTS

| | | | |
|---|---|---|---|
| 1,013,529 | 1/1912 | Burby | 209—17 |
| 1,684,365 | 9/1928 | Dolbear | 209—2 |
| 1,733,070 | 10/1929 | Pattillo | 162—190 XR |
| 1,981,081 | 11/1934 | Simpson | 209—332 |
| 2,183,896 | 12/1939 | Rupp | 210—19 |
| 2,696,302 | 12/1954 | Miller. | |
| 2,835,173 | 5/1958 | Martindale | 209—270 |

FOREIGN PATENTS 677,780    8/1952    Great Britain.

HARRY B. THORNTON, *Primary Examiner.*

HERBERT L. MARTIN, *Examiner.*